(12) United States Patent
Maltz et al.

(10) Patent No.: US 10,067,926 B2
(45) Date of Patent: Sep. 4, 2018

(54) IMAGE PROCESSING SYSTEM AND METHODS FOR IDENTIFYING TABLE CAPTIONS FOR AN ELECTRONIC FILLABLE FORM

(71) Applicant: Xerox Corporation, Norwalk, CT (US)

(72) Inventors: Martin S. Maltz, Rochester, NY (US); Safwan R. Wshah, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 176 days.

(21) Appl. No.: 14/976,613

(22) Filed: Dec. 21, 2015

(65) Prior Publication Data

US 2017/0177558 A1    Jun. 22, 2017

(51) Int. Cl.
*G06F 17/24* (2006.01)
*G06F 3/0488* (2013.01)
*G06F 3/0484* (2013.01)
*G06F 17/26* (2006.01)

(52) U.S. Cl.
CPC ........ *G06F 17/245* (2013.01); *G06F 3/04842* (2013.01); *G06F 3/04883* (2013.01); *G06F 17/243* (2013.01)

(58) Field of Classification Search
CPC .................................................... G06F 17/243
See application file for complete search history.

(56) References Cited

U.S. PATENT DOCUMENTS

| | | | |
|---|---|---|---|
| 5,748,809 A | 5/1998 | Hirsch | |
| 7,509,346 B2 | 3/2009 | Mathew | |
| 8,233,714 B2 | 7/2012 | Zuev et al. | |
| 8,595,230 B1 | 11/2013 | Djabarov | |
| 8,706,762 B1 | 4/2014 | Patzer et al. | |
| 8,825,592 B2* | 9/2014 | Lobo | G06F 17/30719 707/602 |
| 8,892,990 B2 | 11/2014 | Barrus | |
| 2012/0063684 A1 | 3/2012 | Denoue et al. | |
| 2012/0137207 A1 | 5/2012 | Heinz et al. | |
| 2015/0317296 A1* | 11/2015 | Vohra | G06F 17/30 715/221 |
| 2016/0217119 A1* | 7/2016 | Dakin | G06F 17/276 |

* cited by examiner

*Primary Examiner* — James J Debrow
(74) *Attorney, Agent, or Firm* — Fox Rothschild LLP

(57) ABSTRACT

An image processing system for identifying table captions may include a processor and a non-transitory computer-readable storage medium comprising one or more instructions configured to cause the processor to perform image processing of a scanned document to identify boxes of an electronic fillable form that corresponds to the scanned document. The system creates and stores a data structure that includes a box list. The system searches the box list to identify an empty box, uses an adjacency list determine whether the empty box has adjacent boxes, and in response to determining that the empty box has one or more adjacent boxes, creates a table box list that includes the empty box and one or more other boxes from the table to which the empty box belongs. The system uses the adjacency list to identify a row caption and a column caption associated with the empty box.

22 Claims, 7 Drawing Sheets

FIG. 3

IMAGE PROCESSING SYSTEM AND METHODS FOR IDENTIFYING TABLE CAPTIONS FOR AN ELECTRONIC FILLABLE FORM

BACKGROUND

In order to create electronic representations of forms or other documents, it is often helpful to identify fillable fields and associated captions for such forms or documents. However, finding row and column captions for a table often proves particularly challenging. But this information is usually needed to position information entered into a table location in an appropriate location in an electronic database.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, an image processing system for identifying table captions may include a processor and a non-transitory computer-readable storage medium comprising one or more instructions. The instructions are configured to cause the processor to perform image processing of a scanned document to identify one or more boxes of an electronic fillable form that corresponds to the scanned document. Each box includes one or more instructions to define a boundary for display on a touch sensitive display that, when selected via input on the display, will cause an area defined by the boundary to accept content from a user. The system creates and stores in a computer-readable memory a data structure that includes a box list associated with the electronic fillable form that includes an indication of each of the boxes. The system searches the box list to identify a first empty box, uses an adjacency list associated with the first empty box to determine whether the first empty box has one or more adjacent boxes, and in response to determining that the first empty box has one or more adjacent boxes, create a table box list that includes the first empty box and one or more other boxes from the table to which the first empty box belongs, and removes the first empty box and the one or more other boxes from the box list. For one or more empty boxes in the table box list, the system uses the adjacency list to identify a row caption and a column caption associated with the empty box, and stores an indication of empty box, the identified row caption and the identified column caption in the computer-readable memory such that each is associated with the fillable electronic form.

Optionally, the system creates a data structure comprising a box list that includes indications of each box ordered based on a y-coordinate value associated with the corresponding box. The system may sequentially search the box list for a first empty box.

The system may determine whether the adjacency list includes one or more pointers to one or more adjacent boxes. The system may use a breadth first region growing algorithm to identify the one or more other boxes.

Optionally, the system may use the adjacency list to identify a row caption and a column caption associated with the empty box by identifying an empty box from the table box list, accessing the adjacency list to determine whether the empty box has a pointer to a left adjacent box, in response to determining that the empty box has a pointer to a left adjacent box, traversing the pointer until a furthest left most box that is full is identified, and identifying content of the furthest left most box as the row caption for the box. The system may, in response to not identifying a furthest left most box that is full, determining whether the pointer has a pointer to a right adjacent box, in response to determining that the empty box has a pointer to a right adjacent box, traversing the pointer until a furthest right most box that is full is identified, and identifying content of the furthest right most box as the row caption for the box. In response to not identifying a furthest right most box that is full, the system may create a row caption for the box.

Optionally, the system may use the adjacency list to identify a row caption and a column caption associated with the empty box by identifying an empty box from the table box list, accessing the adjacency list to determine whether the empty box has a pointer to a top adjacent box, in response to determining that the empty box has a pointer to a top adjacent box, traversing the pointer until a furthest top most box that is full is identified, and identifying content of the furthest top most box as the column caption for the box. In response to not identifying a furthest top most box that is full, the system may determine whether the pointer has a pointer to a bottom adjacent box, in response to determining that the empty box has a pointer to a bottom adjacent box, traverse the pointer until a furthest bottom most box that is full is identified, and identify content of the furthest bottom most box as the column caption for the box. In response to not identifying a furthest bottom most box that is full, the system may create a column caption for the box.

BRIEF DESCRIPTION OF THE DRAWINGS

FIG. 3 illustrates an example fillable form according to an embodiment.

DETAILED DESCRIPTION

The following terms shall have, for purposes of this application, the respective meanings set forth below:

A "box" refers to a generally square or rectangular-shaped fillable field enclosed by line boundaries. A box may contain text or other content, but may not contain other boxes. In an embodiment, a box may be associated with a row and/or a column of a table.

A "box list" refers to an indication of one or more boxes of an electronic fillable form.

A "caption" refers to a text string representing a title, description or explanation of one or more fillable fields.

A "computing device" or "electronic device" refers to a device that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players and the like. Various elements of an example of a computing device or processor are described below in reference to FIG. 8.

A "fillable field" refers to a portion of an electronic document or file in which information or data may be entered, selected, added or modified. Examples of fillable fields include, without limitation, a check box, a text field, and/or the like.

A "fillable form" or an "electronic fillable form" refers to an electronic document or file having one or more fillable fields.

A "pointer" refers to an object whose value refers to the address of another value stored elsewhere in memory. In an embodiment, a pointer references a location in memory.

A "table" refers to a group of boxes organized into rows and/or columns.

A "table box list" refers to an indication of one or more boxes associated with a table.

A "table list" refers to an indication of one or more tables of an electronic fillable form.

As the popularity of mobile electronic devices such as, for instance, mobile phones and tablets, increases, so does the number of fillable forms being completed using such devices. It is important that tables be converted and processed correctly so that information within a table is stored in an appropriate location and with the proper row and column associations.

Figure 1:
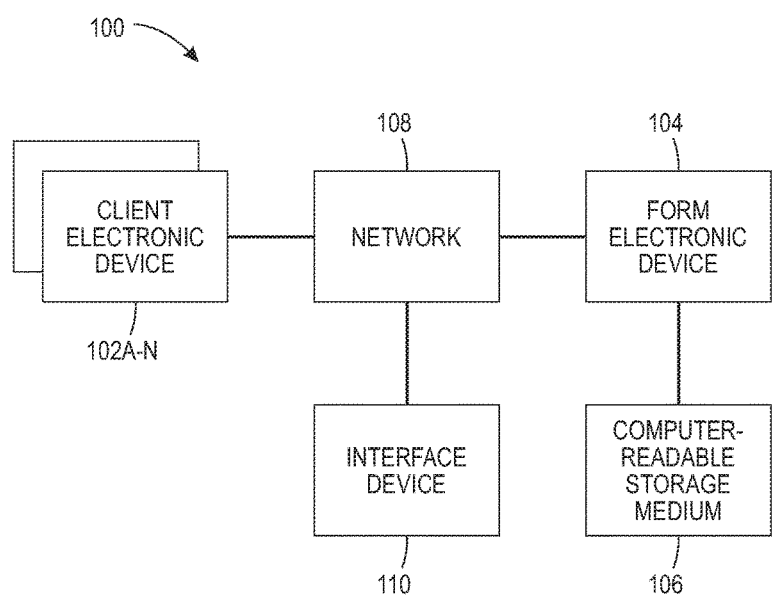
FIG. 1 illustrates an example image processing system of identifying one or more table captions of an electronic fillable form according to an embodiment.

FIG. 1 illustrates an example image processing system of identifying one or more table captions of an electronic fillable form according to an embodiment. As illustrated by FIG. 1, the system 100 may include one or more client electronic devices 102a-N, a form electronic device 104 and a computer-readable storage medium 106. One or more of the client electronic devices 102a-N may be in communication with the form electronic device 104 via a communication network 108. A communication network 108 may be a local area network (LAN), a wide area network (WAN), a mobile or cellular communication network, an extranet, an intranet, the Internet and/or the like. In various embodiments, a client electronic device 102a-N may be a mobile electronic device such as, for example, a smartphone, a tablet and/or the like.

In an embodiment, the system 100 may include an interface device 110 which is capable of performing image processing. For example, an interface device may convert physical documents, such as scanned documents, into electronic data, or converting received data into electronic form. Examples of interface devices include, without limitation, a document scanner device, a multifunction device, an image capturing device, such as a camera or other image sensor, and/or the like. An interface device 110 may include an image sensor which may capture an image of at least a portion of one or more physical documents. Similarly, an electronic device such as, for example, a mobile electronic device may include a camera which may capture an image of at least a portion of one or more physical documents. An interface device 110 may be in communication with a form electronic device 104. For instance, an interface device 110 may capture an image of a physical document, and may convert the physical document into electronic data which it may transmit to a form electronic device 104 over a communication network 108. In other embodiments, an interface device 100 may be a component of a form electronic device 104 or another electronic device.

Figure 2:
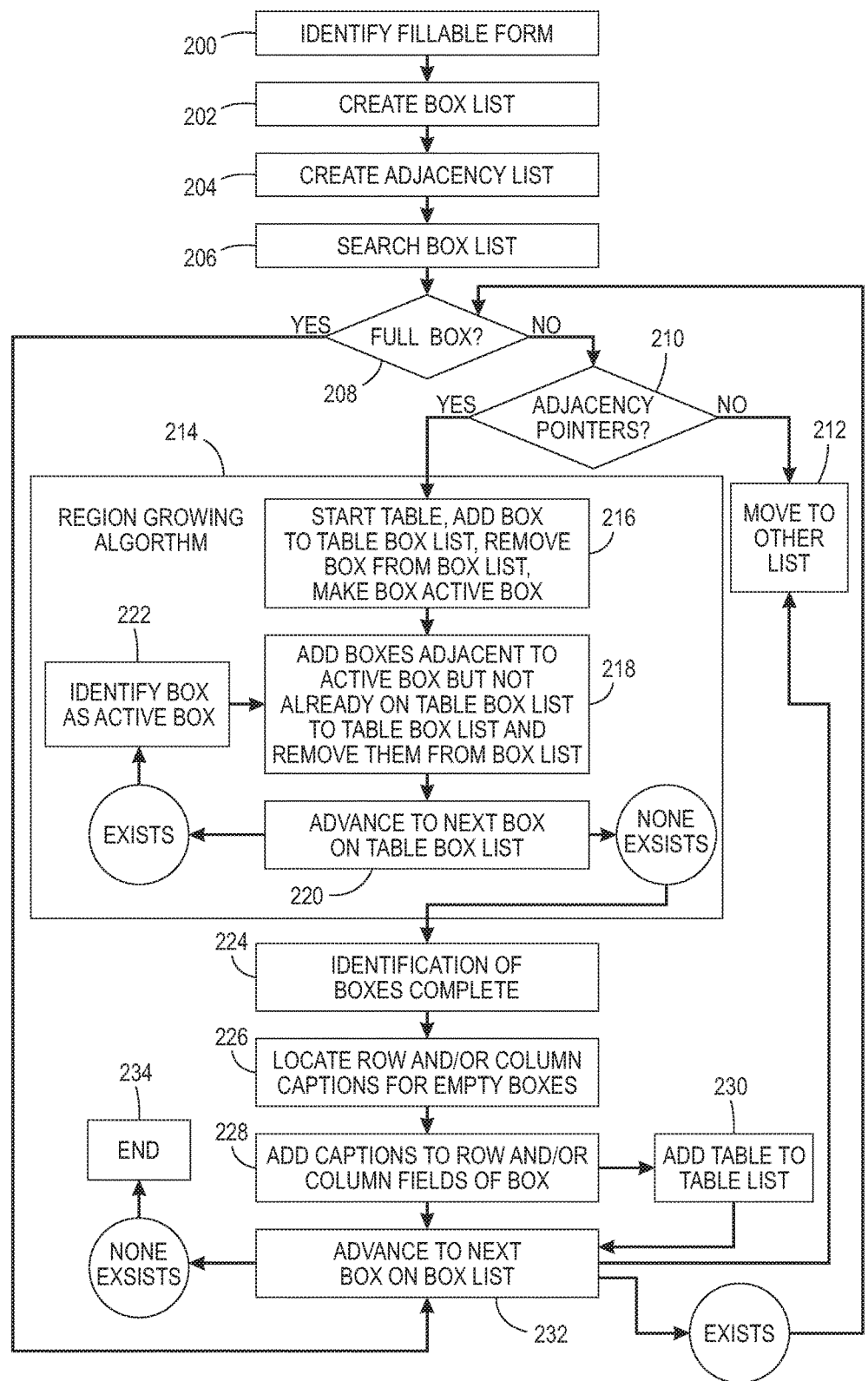
FIG. 2 illustrates a flow chart of an example method of processing tables of an electronic fillable form according to an embodiment.

FIG. 2 illustrates a flow chart of an example method of processing tables of an electronic fillable form according to an embodiment. As illustrated by FIG. 2, a processor may identify 200 a fillable form. A processor may identify 200 a fillable form by recognizing when a fillable form is opened or accessed by a user. For instance, a processor may recognize when a user accesses a fillable webpage, portable document format (PDF) document, and/or the like.

In another embodiment, a processor may identify 200 a fillable form by converting data received from an interface device to data associated with a fillable form. For instance, a user may use an interface device, such as a scanner, to scan a physical document. The interface device may convert the physical document into an electronic document, and may transmit the electronic document to an electronic device, such as a form electronic device. The form electronic device may generate an editable or fillable version of the electronic document, such as a fillable form, which may be accessed or provided to one or more users.

In an embodiment, an electronic fillable form may include one or more tables. A table may be considered to be a raft or collection of adjacent boxes. Empty boxes may be ones that do not include content. As such, empty boxes may be ones that are to be filled. Full boxes may be ones that include content such as, for example, row and/or column headers or captions. A full box refers to a box having information stored within such as, for example, alphanumeric characters. A box may be a type of fillable field. When an electronic device outputs an electronic fillable form on its display device, the display may include one or more subsections or areas that are bounded by the boundary of the box, such that when an electronic device detects that a user has selected an area within the boundary of the box or within a threshold distance from the box, the box will activate by highlighting, displaying a cursor, or otherwise activating so that characters subsequently entered via input will enter into the fillable field that the box defines. For example, if the display is a touch sensitive display, the display may include one or more areas that are bounded by the boundaries of the box such that when a sensor of the touch screen detects that a user has touched the screen within the boundary of the box (or within a threshold distance of the box), the box will activate by highlighting, displaying a cursor, or otherwise activating so that content that is subsequently entered via the touch screen will be entered into the fillable field that the box defines.

A fillable field may be any portion of a form in which information may be selected, added, or modified. For example, a fillable field may be a check box, a free text field and/or the like. In certain embodiments, information may be entered into a fillable form using one or more input devices such as, for example, a finger or a stylus on a touch screen display. For instance, a processor may cause one or more fillable fields to be displayed to a user via a display device associated with a client electronic device. A user may enter, select and/or modify information of a fillable field by selecting the fillable field or an area in or around the fillable field. In the case of a touch screen display device, a user may use his or her finger to touch the fillable field or an area surrounding the fillable field. When a sensor of the display's touch-sensitive screen detects that a user has touched the screen within the fillable field or within a threshold distance of the fillable field, the fillable field may activate so that content, such as text, numbers or symbols, that are subsequently entered into the device will be added to the fillable field. A table may be considered a collection of fillable fields and/or non-fillable fields such as, for example, row captions, column captions and/or the like.

Figure 3:
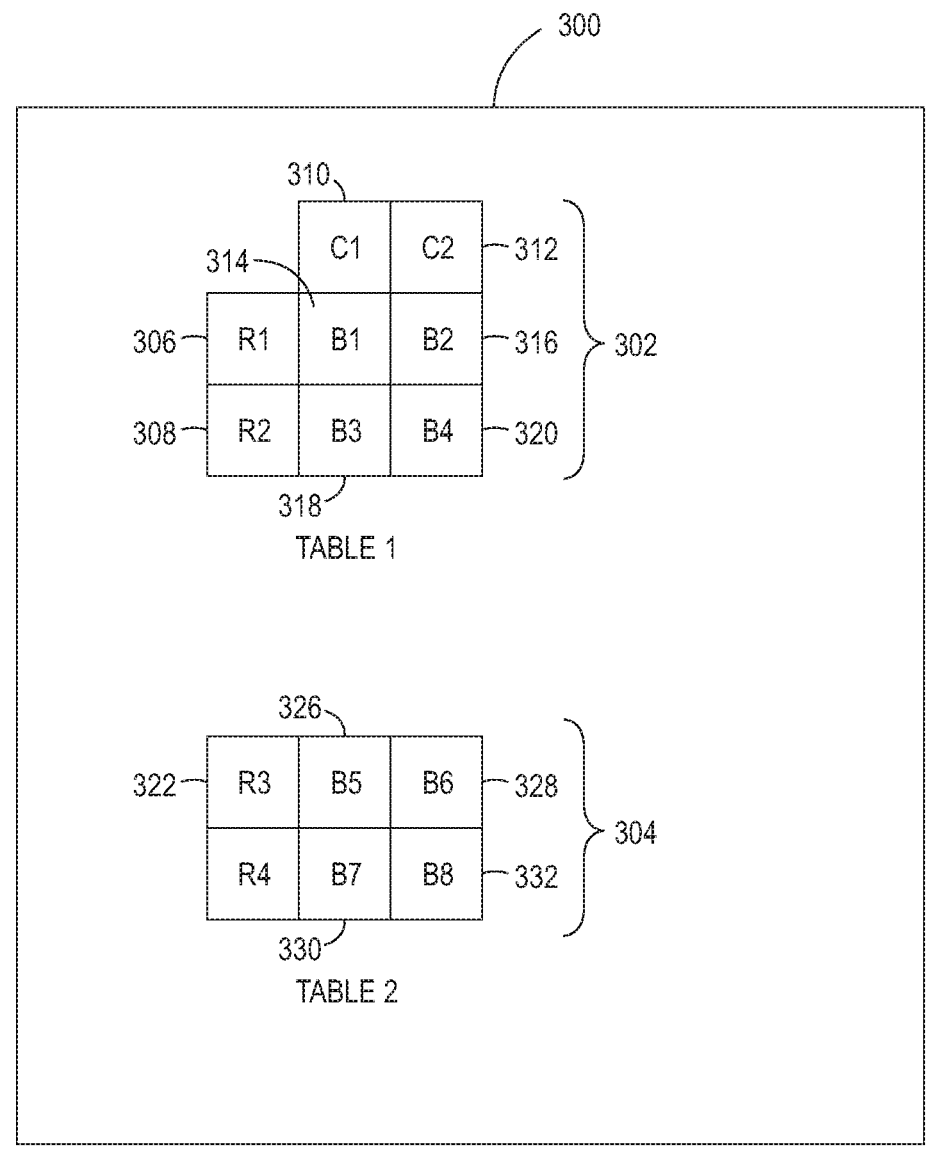

FIG. 3 illustrates an example fillable form according to an embodiment. As illustrated by FIG. 3, an electronic fillable form 300 includes two tables, Table 1 302 and Table 2 304. Table 1 302 includes two rows and two columns. Boxes 306, 308 illustrate full boxes that each includes row captions. Boxes 310, 312 illustrate full boxes that each includes column captions. Boxes 314, 316, 318, 320 each illustrate an empty box. Similarly, Table 2 304 includes two rows. Boxes 322, 324 illustrate full boxes that each includes row captions. Boxes 326, 328, 330, 332 each illustrate an empty box.

As illustrated by Table 1 of FIG. 3, boxes 306, 310, 316 and 318 may be considered to be adjacent to box 314. In an embodiment, an adjacency list may include, for one or more boxes, pointers to one or more adjacent boxes. For instance, an adjacency list associated with box 314 in FIG. 3 may include a pointer to box 306, a pointer to box 310, a pointer to box 316 and a pointer to box 318.

As shown by FIG. 2, a processor may create 202 a box list associated with an electronic fillable form. A box list may include an indication or identifier associated with one or more boxes that are included in the electronic fillable form. A processor may identify one or more boxes from an electronic fillable form, and may add indications of such boxes to a box list. In an embodiment, a processor may use flood fill algorithms or other techniques known in the art to identify boxes from an electronic fillable form. A processor may locate content of one or more boxes by using connected component analysis or other techniques that are known in the art. The located content may be read using optical character recognition (OCR) techniques.

Figure 4:
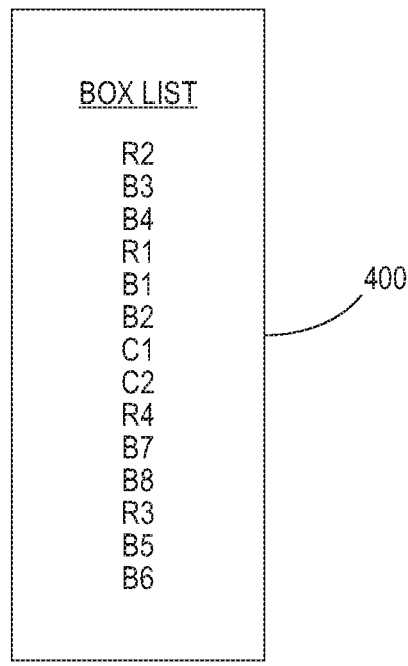
FIG. 4 illustrates an example box list according to an embodiment.

In an embodiment, a processor may create 202 a box list that includes boxes sorted by their y-coordinates so that boxes that are nearby one another in an electronic fillable form are nearby one another in the box list. For instance, a processor may identify y-coordinates associated with one or more boxes and may create a box list that orders the boxes based on their y-coordinates. FIG. 4 illustrates an example box list 400 associated with the fillable form of FIG. 3.

In an embodiment, a processor may create 204 an adjacency list for the identified boxes. An adjacency list includes, for one or more boxes, information indicative of one or more adjacent boxes. In an embodiment, a box may be considered to be adjacent to another box if it is directly to the left, to the right, above or below the box. In another embodiment, a box may be considered to be adjacent to another box if one or more of its boundaries touches or is contact with one or more boundaries of the other box. In an embodiment, a processor may create 204 an adjacency list by determining, for one or more boxes, whether the box has any adjacent boxes. If so, the processor may add a pointer from the box to each adjacent box. The processor may maintain a list of all such added pointers, and an indication of adjacent boxes for one or more boxes. For instance, a processor may store adjacency pointers in a data structure that is associated with or describes the corresponding box. As such, a processor may be able to identify one or more adjacent boxes for a particular box by accessing the data structure associated with the particular box. The processor may maintain the adjacency list, tables, box lists or other information in a database, such as a relational database, or other memory location associated with the identified electronic fillable form.

In an embodiment, referring back to FIG. 2, a processor may perform a search 206 of the box list by identifying a first box in the box list. The processor may determine 208 whether the identified box is a full box. For example, the processor may determine whether the identified box comprises content. If the processor determines that the box is a full box, the processor may move 232 to a next box in the box list, if one exists. If one does not exist, the processor may stop 234 its search.

In an embodiment, if a processor determines that an identified box is not full, the processor may determine 210 whether the identified box is associated with any adjacency pointers. A processor may determine 210 whether a box is associated with any adjacency pointers by referencing the adjacency list associated with the corresponding box. For instance, a processor may access an adjacency list for a particular box and may see if that box is associated with one or more pointers to one or more adjacent boxes.

If the processor determines 210 that the box is not associated with one or more adjacent pointers, the processor may remove 212 the identified box from the box list, and may add it to a different box list. A box that does not have any adjacency pointers is not considered to be part of a table, but is considered to be a fillable field like the other empty boxes. As such, a processor may at some point search the vicinity of the boxes that do not have adjacency pointers on the electronic fillable form to identify text strings which might be used as captions. In an embodiment, the processor may move 232 to a next box in the box list, if one exists. If one does not exist, the processor may stop 234 its search.

Figure 5:
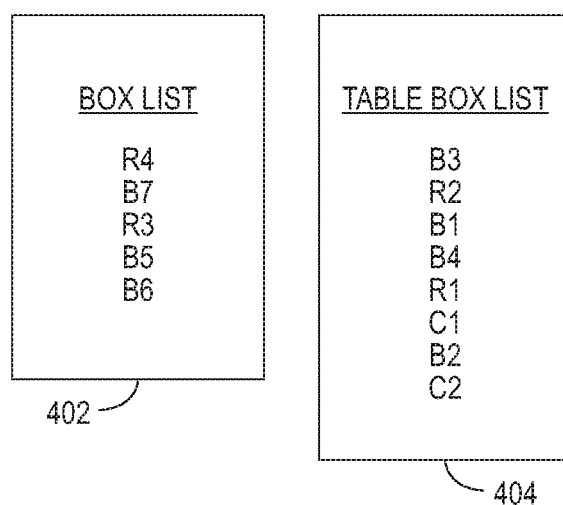
FIG. 5 illustrates an example box list and a table box list according to an embodiment.

If the processor determines 210 that the box is associated with one or more adjacency pointers, the processor may apply 214 a region growing algorithm to identify one or more other boxes in a table associated with the box. As illustrated by FIG. 2, a processor may apply 214 a region growing algorithm by starting a table, removing the box from the box list, and adding the box to a table box list associated with the table 216. FIG. 5 illustrates a box list 402 from FIG. 4 after box B3 and the boxes from Table 1 (illustrated in FIG. 3) have been removed from the box list. FIG. 5 also illustrates a table box list 404 associated with Table 1 from FIG. 3. The processor may also maintain an active box pointer to the box to indicate that the processor is currently analyzing the box.

In various embodiments, the processor may add 218 boxes that are adjacent to the active box but not already included in the table box list to the end of the table box list and remove them from the box list. The processor may then identify 220 a next box from the table box list. A processor may identify 220 a next box from the table box list by analyzing the table box list in a sequential order, and identifying the next box in that sequential order, if one exists. The processor may identify 222 the next box as an active box, and may repeat steps 218, 220. If a processor determines that a next box does not exist, the processor may determine 224 that identification of the boxes is complete.

Figure 6:
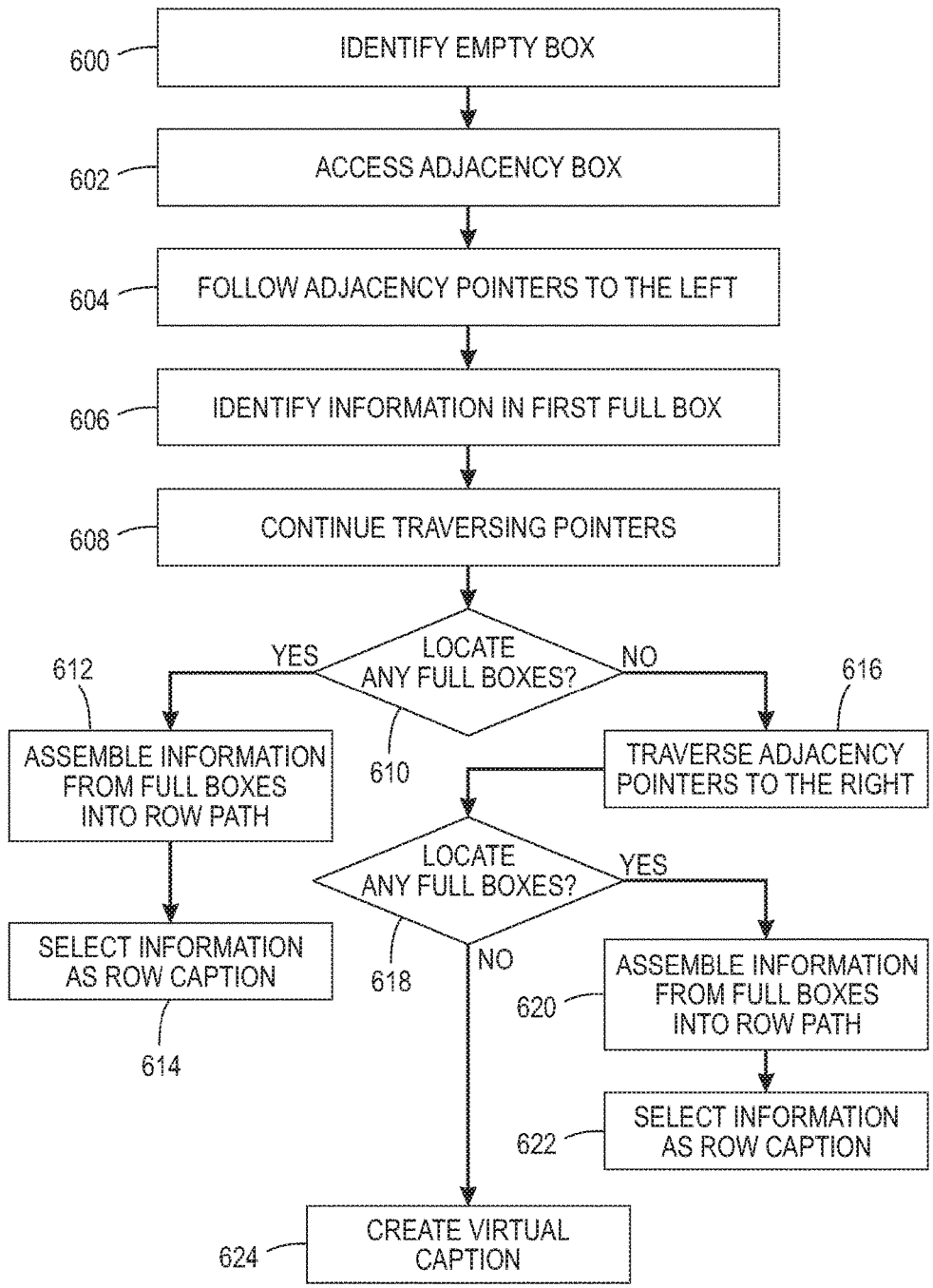
FIG. 6 illustrates a flow chart of an example method of locating row captions according to an embodiment.

In an embodiment, the processor may locate 226 one or more row and/or column captions for each empty box in each table box list. FIG. 6 illustrates a flow chart of an example method of locating 226 row captions according to an embodiment. As shown by FIG. 6, a processor may identify 600 an empty box from a table box list. The processor may access 602 an adjacency list for the box, and may follow 604 adjacency pointers to the left until it locates a full box. The processor may identify 606 the information contained in the first full box that it encounters as the lowest level row caption for the box. However, that row may be part of a group of rows with a higher level caption. As such, the processor may continue 608 traversing pointers to the left until all full boxes, if any, have been located. In an embodiment, a processor may determine 610 whether it located any full boxes. If so, the information contained in all of the full boxes that were encountered may be assembled 612 into a multi-level row path. In an embodiment, the processor may select 614 the information that is associated with the left-most box as the row caption for the box.

If the processor determines 610 that no full boxes are found traversing the adjacency list to the left, the processor may instead traverse 616 the adjacency list to the right until it locates a full box. The processor may identify the information contained in the first full box that it encounters as the lowest level row caption for the box. However, that row may be part of a group of rows with a higher level caption. As such, the processor may continue following pointers to the right until all full boxes, if any, have been located. In an embodiment, a processor may determine 618 whether it located any full boxes. If so, the information contained in all of the full boxes that were encountered may be assembled 620 into a multi-level row path. In an embodiment, the processor may select 622 the information that is associated with the right-most box as the row caption for the box.

In an embodiment, the processor determines 618 that no full boxes were found traversing the adjacency list to the left or the right, the processor may create 624 a virtual caption for the box. For instance, a processor may create 624 a virtual caption that includes the y-coordinate value of the box. Additional and/or alternate values may be used within the scope of this disclosure.

Referring back to FIG. 2, a processor may store 228 an indication of the applicable row and/or column captions to the row and/or column fields associated with the box. For instance, the processor may create and store in memory an electronic file associated with the electronic fillable form that indicates the box is associated with the selected row caption or the created virtual row caption. In another embodiment, a processor may add an entry to a data structure that such association exists.

Figure 7:
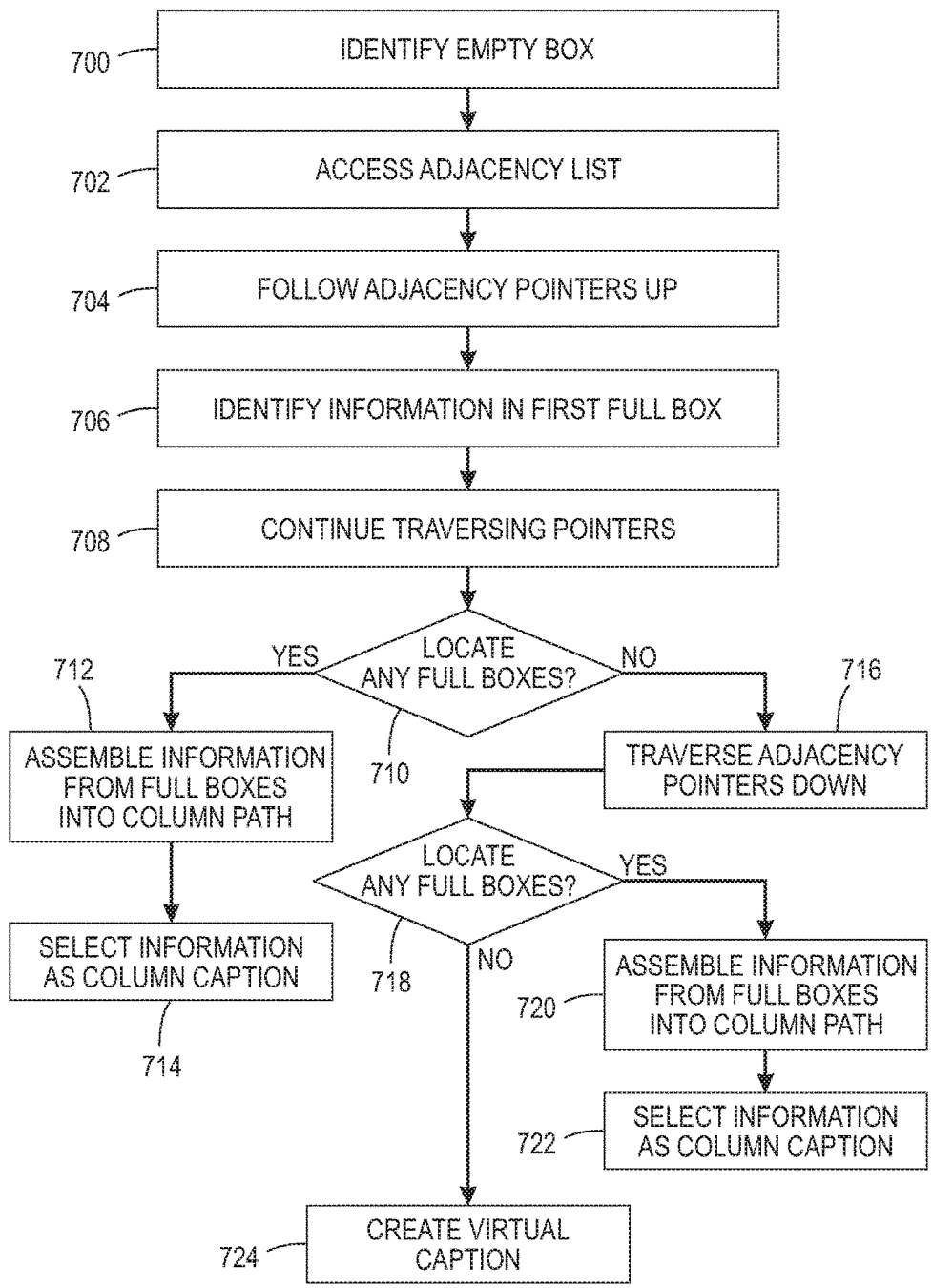
FIG. 7 illustrates a flow chart of an example method of locating column captions according to an embodiment.

In various embodiments, a similar approach may be used to identify column captions for a box. FIG. 7 illustrates a flow chart of an example method of locating column captions according to an embodiment. As shown in FIG. 7, a processor may identify 700 an empty box from a table box list. The processor may access 702 an adjacency list for the box, and may follow 704 adjacency pointers up until it locates a full box. The processor may identify 706 the information contained in the first full box that it encounters as the lowest level column caption for the box. However, that column may be part of a group of columns with a higher level caption. As such, the processor may continue 708 traversing pointers up until all full boxes, if any, have been located. In an embodiment, a processor may determine 710 whether it located any full boxes. If so, the information contained in all of the full boxes that were encountered may be assembled 712 into a multi-level column path. In an embodiment, the processor may select 714 the information that is associated with the top-most box as the column caption for the box.

If the processor determines 710 that no full boxes are found traversing the adjacency list up, the processor may instead traverse 716 the adjacency list down until it locates a full box. The processor may identify the information contained in the first full box that it encounters as the lowest level column caption for the box. However, that column may be part of a group of columns with a higher level caption. As such, the processor may continue following pointers to down until all full boxes, if any, have been located. In an embodiment, a processor may determine 718 whether it located any full boxes. If so, the information contained in all of the full boxes that were encountered may be assembled 720 into a multi-level column path. In an embodiment, the processor may select 722 the information that is associated with the bottom-most box as the column caption for the box.

In an embodiment, if the processor determines 718 that no full boxes were found traversing the adjacency list up or down, the processor may create 724 a virtual caption for the box. For instance, a processor may create 724 a virtual caption that includes the x-coordinate value of the box. Additional and/or alternate values may be used within the scope of this disclosure.

Referring back to FIG. 2, a processor may store 228 an indication that the box is associated with the selected column caption or the created virtual caption. For instance, the processor may create and store in memory an electronic file associated with the electronic fillable form that indicates the box is associated with the selected column caption or the created virtual column caption. In another embodiment, a processor may add an entry to a data structure that such association exists.

Figure 9:
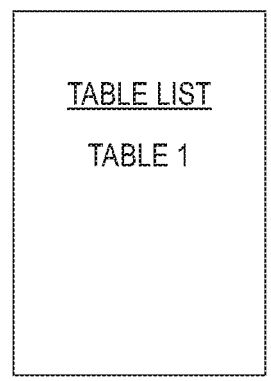
FIG. 9 illustrates an example table list according to an embodiment.

In an embodiment, a processor may add 230 the created table, or an indication of the created table, to a table list. FIG. 9 illustrates an example table list showing that Table 1 from FIG. 3 has been added. In various embodiments, a processor may move 232 to a next box in the box list, if one exists. If one does not exist, the processor may stop 234 its search.

In an embodiment, one or more boxes that are not part of a table may remain on the box list after all of the tables have been found. The boxes that remain on the box list may be full boxes in that they include content. For these boxes, the content may be considered to be the caption of the box. For one or more full boxes that remain on the box list, the processor may create a fillable field inside the box, and the content of the box may be assigned as the caption of the fillable field.

Figure 8:
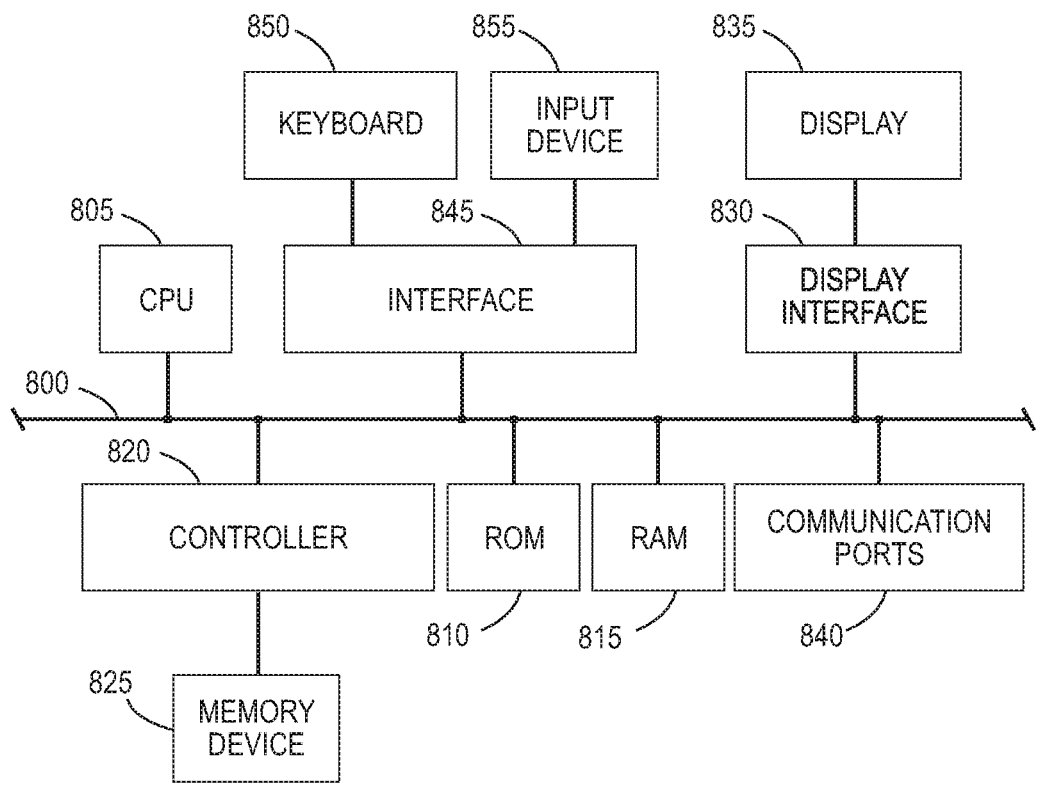
FIG. 8 illustrates a block diagram of example hardware that may be used to contain or implement program instructions according to an embodiment.

FIG. 8 depicts a block diagram of an example of internal hardware that may be used to contain or implement program instructions, such as the process steps discussed above, according to embodiments. A bus 800 serves as an information highway interconnecting the other illustrated components of the hardware. CPU 805 represents one or more processors of the system, performing calculations and logic operations required to execute a program. CPU 805, alone or in conjunction with one or more of the other elements disclosed in FIG. 8, is an example of a processing device, computing device or processor as such terms are used within this disclosure. Read only memory (ROM) 810 and random access memory (RAM) 815 constitute examples of memory devices or processor-readable storage media.

A controller 820 interfaces with one or more optional tangible, computer-readable memory devices 825 to the system bus 800. These memory devices 812 may include, for example, an external or internal disk drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 810 and/or the RAM 815. Optionally, the program instructions may be stored on a tangible computer readable medium 825 such as a compact disk, a digital disk, flash memory, a memory card, a USB drive, an optical disc storage medium, such as a Blu-ray™ disc, and/or other recording medium controlled via a disk controller 820

An optional display interface 840 may permit information from the bus 800 to be displayed on the display 845 in audio, visual, graphic or alphanumeric format. Communication with external devices, such as a printing device, may occur using various communication ports 850. A communication port 850 may be attached to a communications network, such as the Internet or an intranet.

The hardware may also include an interface 855 which allows for receipt of data from input devices such as a keyboard 860 or other input device 865 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. An image processing system of identifying table captions, the system comprising:
    a processor; and
    a non-transitory computer-readable storage medium comprising one or more instructions that are configured to cause the processor to:
        perform image processing of a scanned document to identify one or more boxes of an electronic fillable form that corresponds to the scanned document, wherein each box comprises one or more instructions to define a boundary for display on a touch sensitive display that, when selected via input on the display, will cause an area defined by the boundary to accept content from a user,
        create and store in a computer-readable memory a data structure comprising a box list associated with the electronic fillable form, wherein the box list includes an indication of each of the boxes,
        search the box list to identify a first empty box,
        use an adjacency list associated with the first empty box to determine whether the first empty box has one or more adjacent boxes,
        in response to determining that the first empty box has one or more adjacent boxes:
            create a table box list that includes the first empty box and one or more other boxes from the table to which the first empty box belongs, and
            remove the first empty box and the one or more other boxes from the box list,
        for one or more empty boxes in the table box list, using the adjacency list to identify a row caption and a column caption associated with the empty box, and
        store an indication of empty box, the identified row caption and the identified column caption in the computer-readable memory such that each is associated with the fillable electronic form.

2. The system of claim 1, wherein the instructions that are configured to create a data structure comprising a box list associated with the electronic fillable form comprise instructions that are configured to cause the processor to create a data structure comprising a box list that includes indications of each box ordered based on a y-coordinate value associated with the corresponding box.

3. The system of claim 2, wherein the instructions that are configured to search the box list to identify a first empty box comprise instructions that are configured to cause the processor to sequentially search the box list for a first empty box.

4. The system of claim 1, wherein the instructions that are configured to use an adjacency list to determine whether the first empty box has one or more adjacent boxes comprise instructions that are configured to cause the processor to determine whether the adjacency list includes one or more pointers to one or more adjacent boxes.

5. The system of claim 1, wherein the instructions that are configured to create a table box list that includes the first empty box and one or more other boxes from the table to which the first empty box belongs comprise instructions that are configured to cause the processor to use a breadth first region growing algorithm to identify the one or more other boxes.

6. The system of claim 1, wherein the instructions that are configured to use the adjacency list to identify a row caption and a column caption associated with the empty box comprise instructions that are configured to:
    identify an empty box from the table box list;
    access the adjacency list to determine whether the empty box has a pointer to a left adjacent box;
    in response to determining that the empty box has a pointer to a left adjacent box, traverse the pointer until a furthest left most box that is full is identified; and
    identify content of the furthest left most box as the row caption for the box.

7. The system of claim 6, further comprising instructions that are configured to cause the processor to:
    in response to not identifying a furthest left most box that is full:
        determining whether the pointer has a pointer to a right adjacent box,
        in response to determining that the empty box has a pointer to a right adjacent box, traversing the pointer until a furthest right most box that is full is identified, and
        identifying content of the furthest right most box as the row caption for the box.

8. The system of claim 7, further comprising instructions that are configured to cause the processor to, in response to not identifying a furthest right most box that is full, creating a row caption for the box.

9. The system of claim 1, wherein the instructions that are configured to use the adjacency list to identify a row caption and a column caption associated with the empty box comprise instructions that are configured to:
    identify an empty box from the table box list;

access the adjacency list to determine whether the empty box has a pointer to a top adjacent box;
in response to determining that the empty box has a pointer to a top adjacent box, traverse the pointer until a furthest top most box that is full is identified; and
identify content of the furthest top most box as the column caption for the box.

10. The system of claim 9, further comprising instructions that are configured to cause the processor to:
in response to not identifying a furthest top most box that is full:
determining whether the pointer has a pointer to a bottom adjacent box,
in response to determining that the empty box has a pointer to a bottom adjacent box, traversing the pointer until a furthest bottom most box that is full is identified, and
identifying content of the furthest bottom most box as the column caption for the box.

11. The system of claim 10, further comprising instructions that are configured to cause the processor to, in response to not identifying a furthest bottom most box that is full, creating a column caption for the box.

12. A method of identifying table captions, the method comprising:
performing image processing of a scanned document by a processor to identify one or more boxes of an electronic fillable form that corresponds to the scanned document, wherein each box comprises one or more instructions to define a boundary for display on a touch sensitive display that, when selected via input on the display, will cause an area defined by the boundary to accept content from a user;
creating and storing in a computer-readable memory a data structure comprising a box list associated with the electronic fillable form, wherein the box list includes an indication of each of the boxes;
searching the box list to identify a first empty box;
using an adjacency list associated with the first empty box to determine whether the first empty box has one or more adjacent boxes;
in response to determining that the first empty box has one or more adjacent boxes:
creating a table box list that includes the first empty box and one or more other boxes from the table to which the first empty box belongs, and
removing the first empty box and the one or more other boxes from the box list,
for one or more empty boxes in the table box list, using the adjacency list to identify a row caption and a column caption associated with the empty box; and
storing an indication of empty box, the identified row caption and the identified column caption in the computer-readable memory such that each is associated with the fillable electronic form.

13. The method of claim 12, wherein creating a data structure comprising a box list associated with the electronic fillable form comprises creating a data structure comprising a box list that includes indications of each box ordered based on a y-coordinate value associated with the corresponding box.

14. The method of claim 13, wherein searching the box list to identify a first empty box comprises sequentially searching the box list for a first empty box.

15. The method of claim 12, wherein using an adjacency list to determine whether the first empty box has one or more adjacent boxes comprises determining whether the adjacency list includes one pointers to one or more adjacent boxes.

16. The method of claim 12, wherein creating a table list that includes the first empty box and one or more other boxes from the table to which the first empty box belongs comprises using a breadth first region growing algorithm to identify the one or more other boxes.

17. The method of claim 12, wherein using the adjacency list to identify a row caption and a column caption associated with the empty box comprises:
identifying an empty box from the table list;
accessing the adjacency list to determine whether the empty box has a pointer to a left adjacent box;
in response to determining that the empty box has a pointer to a left adjacent box, traversing the pointer until a furthest left most box that is full is identified; and
identifying content of the furthest left most box as the row caption for the box.

18. The method of claim 17, further comprising:
in response to not identifying a furthest left most box that is full:
determining whether the pointer has a pointer to a right adjacent box,
in response to determining that the empty box has a pointer to a right adjacent box, traversing the pointer until a furthest right most box that is full is identified, and
identifying content of the furthest right most box as the row caption for the box.

19. The method of claim 18, further comprising, in response to not identifying a furthest right most box that is full, creating a row caption for the box.

20. The method of claim 12, wherein using the adjacency list to identify a row caption and a column caption associated with the empty box comprises:
identifying an empty box from the table list;
accessing the adjacency list to determine whether the empty box has a pointer to a top adjacent box;
in response to determining that the empty box has a pointer to a top adjacent box, traversing the pointer until a furthest top most box that is full is identified; and
identifying content of the furthest top most box as the column caption for the box.

21. The method of claim 20, further comprising:
in response to not identifying a furthest top most box that is full:
determining whether the pointer has a pointer to a bottom adjacent box,
in response to determining that the empty box has a pointer to a bottom adjacent box, traversing the pointer until a furthest bottom most box that is full is identified, and
identifying content of the furthest bottom most box as the column caption for the box.

22. The method of claim 21, further comprising, in response to not identifying a furthest bottom most box that is full, creating a column caption for the box.

* * * * *